W. W. PALMER.
BUTTER CUTTER.
APPLICATION FILED SEPT. 2, 1919.
1,360,572.
Patented Nov. 30, 1920.
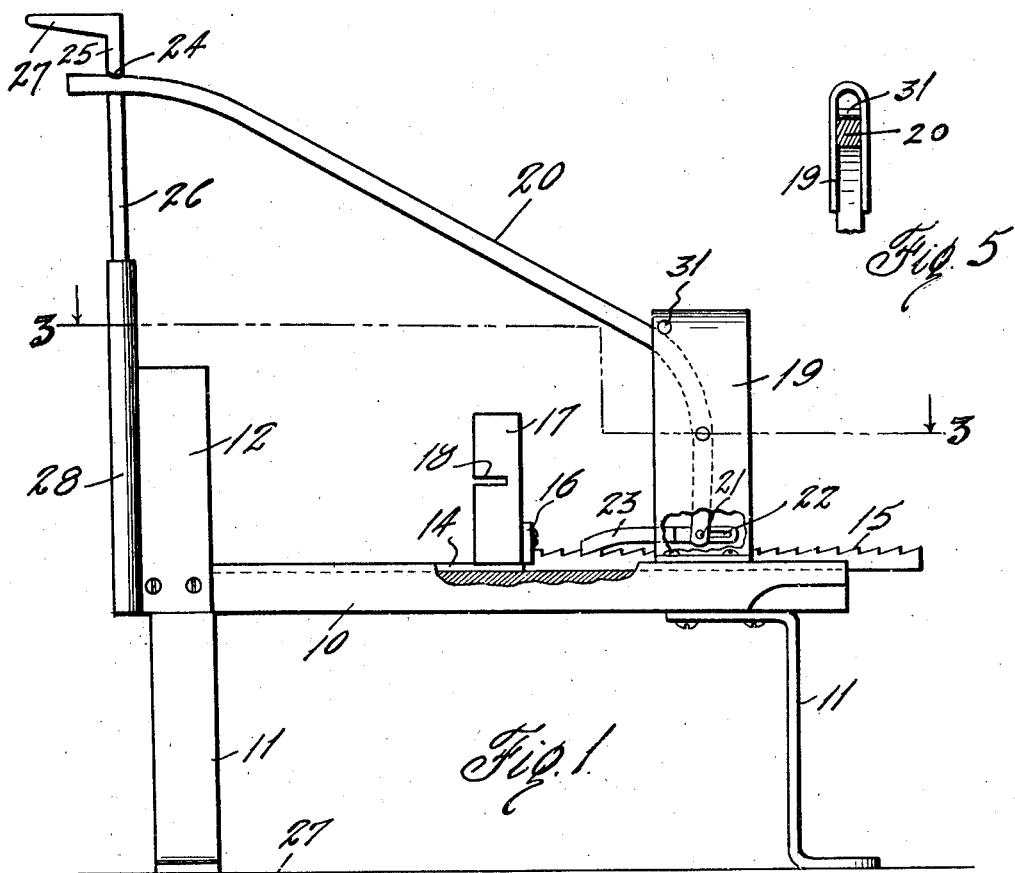
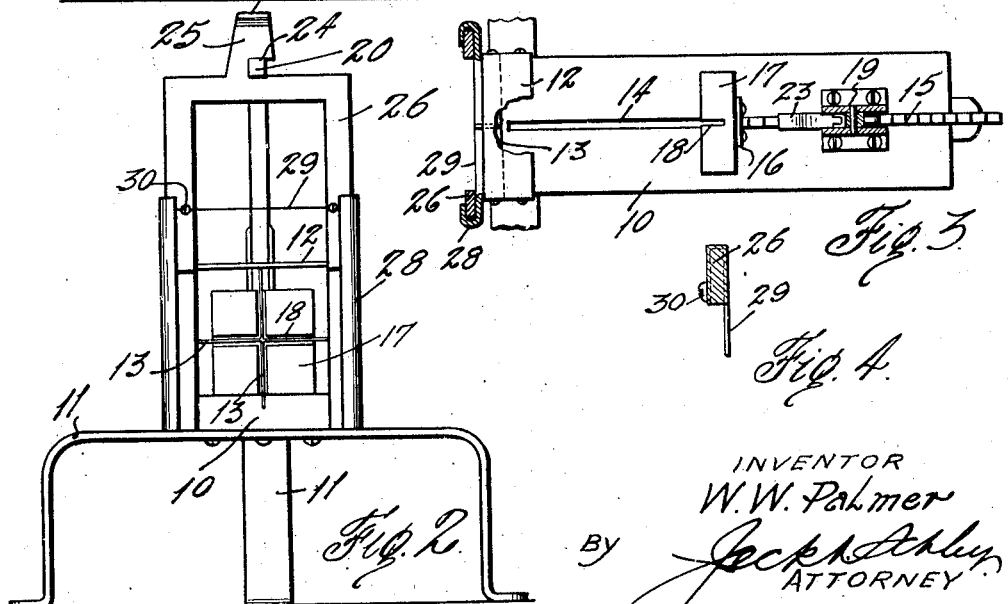
INVENTOR
W. W. Palmer
BY
ATTORNEY

UNITED STATES PATENT OFFICE.

WILLIAM W. PALMER, OF DALLAS, TEXAS, ASSIGNOR OF ONE-HALF TO HENRY E. GROSSMAN, OF DALLAS, TEXAS.

BUTTER-CUTTER.

1,360,572.   Specification of Letters Patent.   Patented Nov. 30, 1920.

Application filed September 2, 1919. Serial No. 320,967.

*To all whom it may concern:*

Be it known that I, WILLIAM W. PALMER, a citizen of the United States, residing at Dallas, in the county of Dallas and State of Texas, have invented certain new and useful Improvements in Butter-Cutters, of which the following is a specification.

This invention has relation to butter cutters and particularly to the dispensing type.

It is highly desirable to cut a cake of butter into a number of small cakes or " pats " for economical service in cafés and hotels.

My invention has particularly to do with a device for this purpose and involves means for expeditiously and efficiently cutting the butter in an even manner and with the use of a simple device.

In carrying out the invention a support is provided with a fixed cutter for quartering the block of butter longitudinally. A simple presser-head is arranged on the support for pressing the block against the cutters. A shearing member carries a severing element for cutting the quarters transversely into small cakes or " pats." One of the particular features is a connection between the shearing member and a feed device for the presser-head, whereby the shearing member is elevated to feed the presser-head and forced downward to sever the quarters; the parts being so arranged that when the member is elevated the severing element will pass above the block of butter before the latter is fed forward to be severed. The structure being simple and of a few parts makes for sanitation as they are easily and readily cleaned.

The invention will be more readily understood from a reading of the following specification and by reference to the accompanying drawings, in which an example of the invention is shown, and wherein:

Figure 1 is a side elevation of a device constructed in accordance with this invention, Fig. 2 is a front elevation of the same, Fig. 3 is a longitudinal transverse sectional view on the line 3—3 of Fig. 1, Fig. 4 is a detail of the severing element, and Fig. 5 is a detail of the lever stop.

In the drawing the numeral 10 designates a table supported at each end on legs 11. At the front end of the table an upright metal frame 12 is fastened. Within this frame a bearing of cutter plates 13 is mounted so as to bi-sect at their centers and acting to cut a block of butter into four parts when the latter is placed against said plates. A longitudinal central groove 14 is provided in the table and a rack bar 15 is slidable in said groove. The bar carries a bracket 16 at its forward end to which an upright head 17 is fastened. The head has cross grooves 18 positioned to receive the cutters so that all of the butter may be expelled from between said cutters when the head reaches the limit of its forward strokes. The bar 15 and head 17 constitute a presser-head for forcing the block of butter against and between the cutter plates.

A slotted standard 19 is mounted near the rear end of the table so as to straddle the groove 14. A lever 20 is pivoted in the standard and has a pin 21 in its lower end engaging in the slot 22 of a dog 23 which latter is confined in the standard and projects forward of the same with its free end in engagement with the teeth of the rack bar. The lever 20 is bent and grooved forward so as to ride in the notch 24 of a lug 25 projected upward from the center of a shearing yoke 26. The lug carries a finger grip 27 at its upper end. The yoke is slidable vertically in channel members 28 secured to each side of the frame 12. A severing wire 29 is stretched across the lower portion of the yoke and seated in the rear face thereof as shown in Fig. 4. The wire has its ends passed around the legs of the yoke and fastened by screws 30 on the front side thereof.

It will be seen that when the yoke is pulled upward the lever 20 will be swung so as to move the lower end forward in the standard 19. By reason of the slot 22 the pin 21 will undergo a period of lost motion so that the dog 23 will not be moved until the yoke has been raised high enough to carry the wire 29 above the frame 12. After this point is reached the continued upward movement of the yoke causes the dog to step the presser-head forward so that the block of butter is moved forward and quartered. The quarters of the block of butter will be projected beyond the frame a distance equal to the length of one of the teeth of the bar 15 which is the thickness of the pats to be cut. It will be seen that the wire is carried above the frame before the butter is projected from the same thus making the device easy to operate.

When the yoke is moved downward the wire 29 passes through the projected quarters of the block of butter and cuts off four pats as will be obvious. The pin 21 undergoes the same period of lost motion on the downward stroke as it does on the upward stroke so that the dog is carried back only the distance of one tooth. The upward movement of the lever 20 is limited by a transverse stop 31 at the upper end of the standard; while its downward movement is limited by contact with the top of the frame 12.

It will be seen that by springing the lever 20 to the right so as to disengage it from the notch 24 the yoke 26 may be dropped from the channels for cleaning or replacing the wire and also that the presser-head may be readily pulled forward and lifted from the groove 14 so that the whole device is easily cleaned. The thickness of the butter pats is controlled by the length of the teeth of the rack bar 15 and the throw of the dog 23 which may be varied as desired.

What I claim, is:

In a machine for cutting butter, a support, an upstanding frame secured to one end of the support, substantially vertical guide flanges secured to the outer edges of the frame and disposed wholly outwardly of the support, cutting elements held within the frame, a presser head arranged upon the support to move longitudinally thereof toward the frame, a shearing frame mounted to slide within the guide flanges and to be removed therefrom by a downward movement, a cutting wire carried by the shearing frame, a head secured to the upper end of the shearing frame and adapted to move it, said head having a notch open upon one side, a bracket secured to the support, a resilient lever pivoted to the bracket and having its forward end normally held within the notch, said lever being free from contact with the cutting wire, said forward end of the lever being adapted to be shifted laterally out of the notch, whereby it is disconnected from the shearing frame which may be removed from the guide flanges by a downward movement, a rack bar secured to the presser head, a dog to engage the rack bar and having an elongated slot, and a pivot element carried by the lever and operating within the slot.

In testimony whereof I affix my signature.

WILLIAM W. PALMER.